United States Patent
Rimola

(10) Patent No.: US 9,762,755 B1
(45) Date of Patent: Sep. 12, 2017

(54) IPP SCAN DIRECTORY SERVICE

(71) Applicant: KONICA MINOLTA LABORATORY U.S.A., INC., San Mateo, CA (US)

(72) Inventor: Carlos Rimola, Campbell, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 15/282,401

(22) Filed: Sep. 30, 2016

(51) Int. Cl.
| G06F 15/00 | (2006.01) |
| G06F 3/12 | (2006.01) |
| G06K 1/00 | (2006.01) |
| H04N 1/00 | (2006.01) |
| H04L 29/08 | (2006.01) |
| H04N 1/327 | (2006.01) |

(52) U.S. Cl.
CPC ......... *H04N 1/00228* (2013.01); *H04L 67/02* (2013.01); *H04L 67/26* (2013.01); *H04N 1/00244* (2013.01); *H04N 1/32773* (2013.01); *H04N 2201/0094* (2013.01)

(58) Field of Classification Search
CPC ........... H04N 1/00228; H04N 1/32773; H04N 1/00244; H04N 2201/0094; H04L 67/26; H04L 67/02
USPC ....................... 358/1.15, 1.14, 1.1
See application file for complete search history.

(56) References Cited

U.S. PATENT DOCUMENTS

2010/0231964 A1*  9/2010  Watanabe .......... H04N 1/00222
                                                    358/1.15
2014/0002859 A1*  1/2014  Isoda ................ H04N 1/32416
                                                    358/1.15

OTHER PUBLICATIONS

Peter Zehler et al., "IPP Scan Service (SCAN)", The Printer Working Group, Sep. 18, 2014, pp. 1-51.

* cited by examiner

Primary Examiner — Douglas Tran
(74) Attorney, Agent, or Firm — Buchanan Ingersoll & Rooney PC

(57) ABSTRACT

A method, a system, and a non-transitory computer readable medium are disclosed containing a computer program having computer readable code embodied to carry out a method of providing Uniform Resource Identifiers for Push Scan jobs pursuant to an Internet Printing Protocol (IPP), which includes hosting a database of IPP clients and destination Uniform Resource Identifiers (destination-uris) for each of the IPP clients, the database of destination-uris defining each of the destination-uris in which each of the IPP clients are authorized to send Push Scan jobs; receiving a request from an IPP client for at least one Uniform Resource Identifier (URI) for a Push Scan job; checking the database to determine if the IPP client is authorized to send the Push Scan job to the at least one URI; and sending the destination-uris to the IPP client upon determination that the IPP client is authorized to send the Push Scan job.

20 Claims, 3 Drawing Sheets

IPP SCAN DIRECTORY SERVICE

FIELD OF THE INVENTION

The present disclosure relates to a method, a system, and a computer program having a directory service for storing, administering and distributing destinations systems or hosts on a network for the purposes of IPP (Internet Printing Protocol) Push Scan.

BACKGROUND OF THE INVENTION

The "Printing Working Group" (PWG) is a consortium of printing and network vendors formally allied with the IEEE Industry Standards and Technology Organization (IEEE-ISTO) and responsible for the IPP specifications.

The PWG describes the IPP Scan Service in the specification PWG 5100.17. This specification describes two forms of scanning, "Pull Scan" and "Push Scan. "Pull Scan is a method used to retrieve and store the scanned document(s) in the host system which is running an IPP client which issues a Get-Next-Document-Data request to retrieve the scanned document from a scanner or a Multi-function Peripheral/Device (MFP/MFD) with IPP Scan server functionality. Push Scan is a method used by a host system running an IPP client, which issues an IPP Create-Job request with "/ipp/scan" as part of the printer-uri attribute and includes the destination-uris IPP job template attribute to send the scanned document(s) to one or more destinations. The IPP client may include the access credentials for the destination by including the destination-accesses IPP operation attribute.

The IPP destination-uris attribute defines the protocol to be used to transmit the scanned document(s) to the destinations, which may reside on the local network (LAN) or remotely over the Internet. The protocols supported, for example, can include 'ftp, ftps:', 'http, https:', 'dav:' (aka WebDav), 'ipp, ipps':, 'mailto:' and 'smb:'. As an example, a destination URI to an HTTPS server could be https://mydomain.com/scandocs/example.pdf.

SUMMARY OF THE INVENTION

In consideration of the above issues, it would be desirable to have a method, computer program and network protocol acting as a directory service for storing, administering and distributing destinations systems or hosts on the local network or are remotely accessible via the Internet or any remote medium for the purposes of IPP Push Scan. In accordance with an exemplary embodiment, the destination systems or hosts can be stored in the form of Uniform Resource Identifiers (URIs), and wherein URIs can include Uniform Resource Locators (URLs).

A non-transitory computer readable medium containing a computer program having computer readable code embodied to carry out a method of providing Uniform Resource Identifiers for Push Scan jobs pursuant to an Internet Printing Protocol (IPP) is disclosed, the method comprising: hosting a database of IPP clients and destination Uniform Resource Identifiers (destination-uris) for each of the IPP clients, the database of destination-uris defining each of the destination-uris in which each of the IPP clients are authorized to send Push Scan jobs; receiving a request from an IPP client for at least one Uniform Resource Identifier (URI) for a Push Scan job; checking the database to determine if the IPP client is authorized to send the Push Scan job to the at least one URI; and sending the destination-uris to the IPP client upon determination that the IPP client is authorized to send the Push Scan job to the at least one URI.

A method is disclosed of providing Uniform Resource Identifiers for Push Scan jobs pursuant to an Internet Printing Protocol (IPP), the method comprising: hosting a database of destination Uniform Resource Identifiers (destination-uris) and access credentials (destination-accesses) for one or more IPP clients on a server, the database of destination-uris and destination-accesses defining each of the destination-uris in which the one or more IPP clients are authorized to send a Push Scan job and the access credentials for a receipt of the Push Scan job to access the Push Scan job; receiving a request from an IPP client of the one or more IPP clients for at least one Uniform Resource Identifier (URI) for the Push Scan job; checking the database to determine if the IPP client is authorized to send the Push Scan job to the at least one URI; and sending the destination-uris and destination-accesses to the IPP client upon determination that the IPP client is authorized to send the Push Scan job to the at least one URI.

A system is disclosed for providing Uniform Resource Identifiers for Push Scan jobs pursuant to an Internet Printing Protocol (IPP), the system comprising: a database of destination Uniform Resource Identifiers (destination-uris) and access credentials (destination-accesses) for one or more IPP clients, the database of destination-uris and destination-accesses defining each of the destination-uris in which the one or more IPP clients are authorized to send a Push Scan job and the access credentials for a receipt of the Push Scan job to access the Push Scan job; an IPP client configured to send a request to the database for at least one Uniform Resource Identifier (URI) for the Push Scan job; and a computer program having an IPP Scan directory administrator application configured to: receive the request from the IPP client for the at least one Uniform Resource Identifier (URI) for the Push Scan job; check the database to determine if the IPP client is authorized to send the Push Scan job to the at least one URI; and send the destination-uris and destination-accesses to the IPP client as IPP attributes as described in the IPP Scan Specification (PWG 5100.17) to the IPP client upon determination that the IPP client is authorized to send the Push Scan job to the at least one URI.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
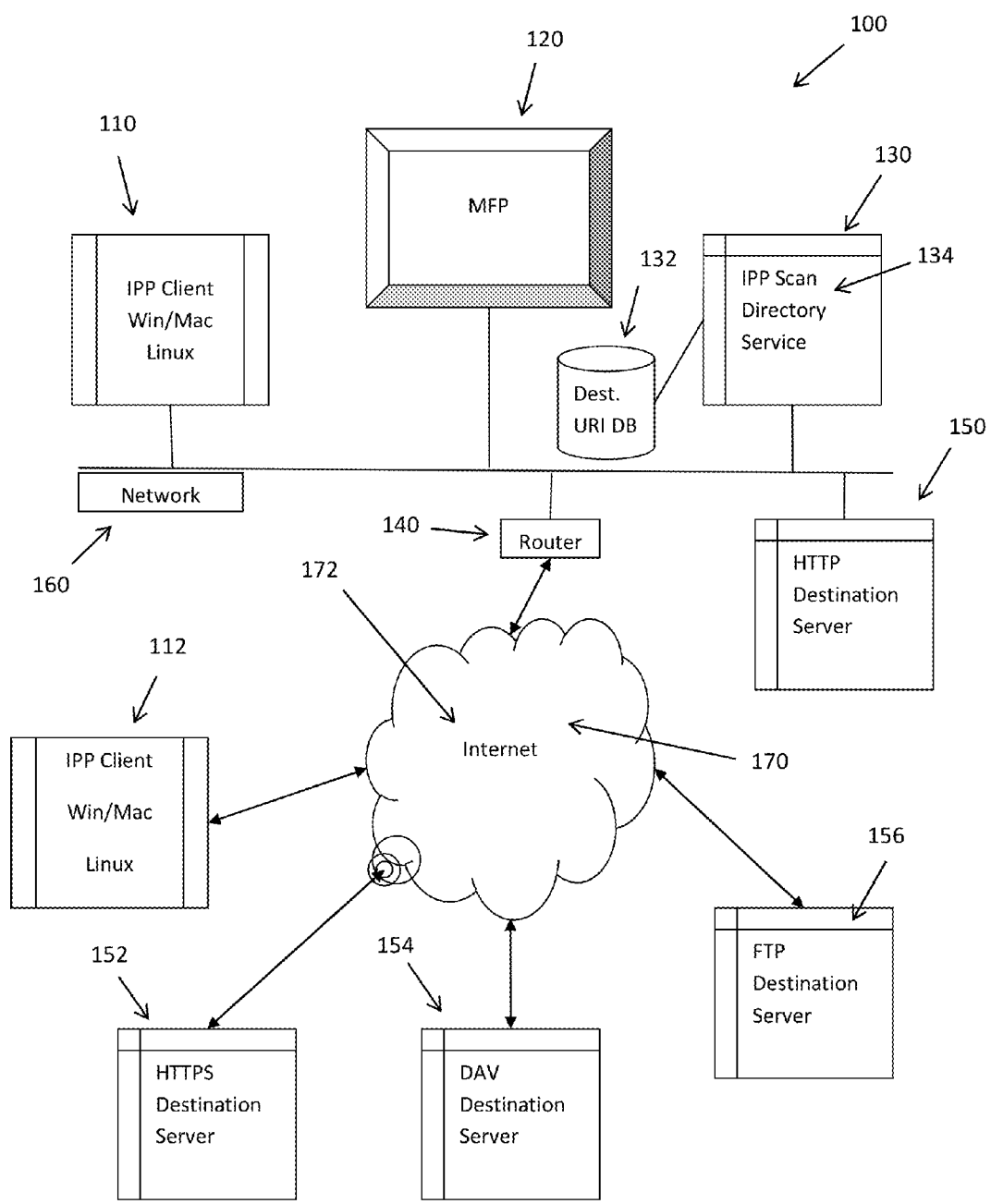
FIG. 1 is an illustration of a system having an IPP scan directory service (ISDS) in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, it would be desirable to have a directory service as described in this disclosure, which defines how the list of destination-uris and corresponding destination-accesses are provided to an IPP client, and which supports the IPP Push Scan function. As per the IPP Scan Specification, it is the IPP client's responsibility to know and provide destination-uris (destination-uniform resources identifiers) and destination-accesses needed for each IPP Push Scan function.

The method and system as disclosed herein includes a directory service, which can be configured such that the directory service uses the IPP protocol for communication between a client and a directory server, which hosts the directory service, and uses IPP or preferably IPPS to ensure secure communications between the client and the directory server, and uses IPP "vendor extension operations" to perform specific requests. In addition, the method and system as disclosed herein can be configured to be specifically applicable to the IPP Scan Service and uses defined IPP attributes to exchange the desired information.

A method, a system, and computer program are disclosed, which act as a directory service for storing, administering and distributing destinations systems or hosts on the local network or are remotely accessible via the Internet or any remote medium for the purposes of IPP Push Scan. In accordance with an exemplary embodiment, a database of IPP clients and a list of destinations, for example, Uniform Resource Identifiers (URI) plus access credentials needed by the IPP clients to perform Push Scan jobs to those destinations, or an IPP Scan directory service ("ISDS") are disclosed. The list of destinations in the directory database can be managed, for example, by a directory server having a database and can be retrieved, added and deleted by the IPP clients, for example, by using IPP "vendor extension operations". In accordance with an exemplary embodiment, the IPP clients can then select which destinations are provided to a scanner or an MFP with a scan unit at the time of creating an IPP Push Scan job.

FIG. 1 is an illustration of a system 100 having an IPP scan directory service (ISDS) in accordance with an exemplary embodiment. As shown in FIG. 1, the system 100 can include at least one client device 110, 112, at least one scanner or Multi-function Peripheral/Device (MFP/MFD) 120, a directory server 130 having a destination URI database 132 and an IPP scan directory service 134, one or more network switches or routers 140, and at least one destination server 150, 152, 154, 156. In accordance with an exemplary embodiment, the at least one destination server 150, 152, 154, 156, can include at least one HTTP destination server 150, 152, at least one DAV destination server 154, and at least one FTP destination Server 156. The at least one client device 110, 112, the at least one scanner or Multi-function Peripheral/Device (MFP/MFD) 120, the directory server 130 having the destination URI database 132, the one or more network switches or routers 140, and the at least one destination server 150, 152, 154, 156, can be connected to one another via a local area network 160 (LAN) and/or a communication network 170, for example, the Internet 172. In accordance with an exemplary embodiment, the at least one destination server 150, 152, 154, 156 can be a server, which supports one or more of the following protocols, 'ftp ftps:', 'http, https:', 'dav:' (aka WebDav), 'ipp, ipps:', 'mailto:' and 'smb:'.

In accordance with an exemplary embodiment, the at least one client device 110, 112 is an IPP client, for example, a PC running Mac OS, Windows, Linux or any OS that contains an IPP client. The at least one client device 110, 112, can include a processor or central processing unit (CPU), and one or more memories for storing software programs and data (such as files to be printed). The processor or CPU carries out the instructions of a computer program, which operates and/or controls at least a portion of the functionality of the at least one client device 110.

As set forth above, the at least one client device 110, 112 includes an operating system (OS), which manages the computer hardware and provides common services for efficient execution of various software programs. The software programs can include, for example, application software and printer driver software. For example, the printer driver software controls a multifunction printer or printer, for example, the scanner or MFP 120 connected with the client device 110 in which the printer driver software is installed via a local area network (LAN) 160 or network connection 170. In certain embodiments, the printer driver software can produce a print job and/or document based on an image and/or document data. In addition, the printer driver software can control transmission of the print job from the at least one client device 110, 112 to the scanner or MFP 120, for example, in the form of a multifunction peripheral or printer. In addition, the printer driver soft is configured support the IPP Push Scan function for scan jobs as disclosed herein. In accordance with an exemplary embodiment, the at least one client device 110, 112 contains IPP Client functionality, for the purpose of submitting Print, Scan, Fax jobs via the IPP protocol. In accordance with an exemplary embodiment, the at least one client device 110, 112, can be, for example, a computer, a tablet, and/or a cell phone.

In accordance with an exemplary embodiment, the scanner or Multi-Functional Peripheral (MFP) 120 is an image forming apparatus and other known apparatuses, which includes at least an image processing section or image reading section, such as a scanner. The image processing section can also include a scanner unit (scanner) for optically reading a document, such as an image recognition system. The scanner section receives the image from the scanner and converts the image into a digital image. The MFP 120 can also be capable of printing an image on a printing medium (or a recording medium) such as a sheet of paper based on printing data generated by the at least one client device 110, 112.

In accordance with an exemplary embodiment, the scanner or MFP 120 can include a printer controller (or firmware), a primary memory section such as Dynamic Random Access Memory (DRAM) and a secondary one, preferably in the form of a hard disk drive (HDD), an image processing section (or data dispatcher), a print engine, and an input/output (I/O) section. The controller of the scanner or MFP 120 can include a central processing unit (CPU), a random access memory (RAM), and a read only memory (ROM). The central processing unit can be configured to execute a sequence of stored instructions (for example, a computer program). The controller can include an operating system (OS), which acts as an intermediary between the software programs and hardware components within the scanner or MFP 120. The operating system (OS) manages the computer hardware and provides common services for efficient execution of various application software. In accordance with an exemplary embodiment, the controller processes the data and job information received from the client device 110 and generates a scan image and optional print image. In accordance with an exemplary embodiment, the MFP 120 includes IPP Server functionality.

The image processing section carries out image processing under the control of the controller, and sends the processed print image data to the print engine. The image processing section is preferably capable of processing multiple print jobs or sub-jobs in parallel and independently. For example, the image processing section can include a CPU that contains multiple cores therein to realize the multiple raster image processor (RIP) modules explained in detail later. The CPU used constituting a part of the controller can be commonly used for the image processing section. The print engine forms an image on a recording sheet based on the image data sent from the image processing section. The I/O section performs data transfer with the at least one client device 110, 112. The controller can be programmed to process data and control various other components of the multifunction peripheral or printer to carry out the various methods described herein. The hard disk drive (HDD) or storage device stores digital data and/or software programs for recall by the controller. In accordance with an exemplary embodiment, the digital data includes resources, which can include, for example, graphics/images, logos, form overlays, and fonts.

In accordance with an exemplary embodiment, the directory server (DS) 130 is configured to host the IPP scan directory service 134 as disclosed herein and includes the destination URI and credentials database 132. The directory server 130 includes an operating system (OS), for example, Linux, which manages the computer hardware and provides common services for efficient execution of various software programs. In accordance with an exemplary embodiment, the IPP scan directory service (ISDS) 134 is an application that manages the destination-uris and destination-accesses database and implements the protocol and IPP operations to retrieve and manage the destination-uris and destination-accesses database 132. As set forth herein, a destination-uris is the IPP attribute that defines the list of destinations for a Push Scan job. The destination-accesses are the IPP attribute that has the access credentials for each destination. The IPP client is an implementation of a client, which implements the IPP protocol for performing IPP requests and receiving IPP responses.

In accordance with an exemplary embodiment, the one or more network switches or routers 140 can include, for example, an Ethernet switch, for example, an Ethernet switch having Link Layer Discovery Protocol (LLDP), a gateway, a router, and the like.

In accordance with an exemplary embodiment, the at least one destination server 150, 152, 154, 156, can be a host system running a service like HTTP or FTP, which is able to receive and store a scanned document using the associated protocol. The at least one destination server 150, 152, 154, 156 can includes an operating system (OS), for example, Linux, which manages the computer hardware and provides common services for efficient execution of various software programs. In addition, the at least one destination server 150, 152, 154, 156 can include a processor or central processing unit (CPU), and one or more memories for storing software programs and data (such as files to be printed). The processor or CPU carries out the instructions of a computer program, which operates and/or controls at least a portion of the functionality of the at least one destination server.

In accordance with an exemplary embodiment, the at least one client device 110, the at least MFP 120, and the directory server 130 can be connected to one another via a communication network 160, for example, a local area network (LAN). In addition, the at least one client device 110, 112, the at least one scanner or Multi-function Peripheral/Device (MFP/MFD) 120, the directory server 130 having the destination URI database 132, the one or more network switches or routers 140, and the at least one destination server 150, 152, 154, 156, can be connected to one another via the communication network 170, for example, the Internet 172.

In accordance with an exemplary embodiment, the communication network 170 can be a public telecommunication line and/or a network (for example, LAN or WAN). Examples of the communication network 170 can include any telecommunication line and/or network consistent with embodiments of the disclosure including, but are not limited to, telecommunication or telephone lines, the Internet, an intranet, a local area network (LAN) as shown, a wide area network (WAN), a near-field communication (NFC), and/or a wireless connection using radio frequency (RF), Wi-Fi, infrared (IR) transmission, Bluetooth, and/or Universal Serial Bus (USB).

Figure 2:
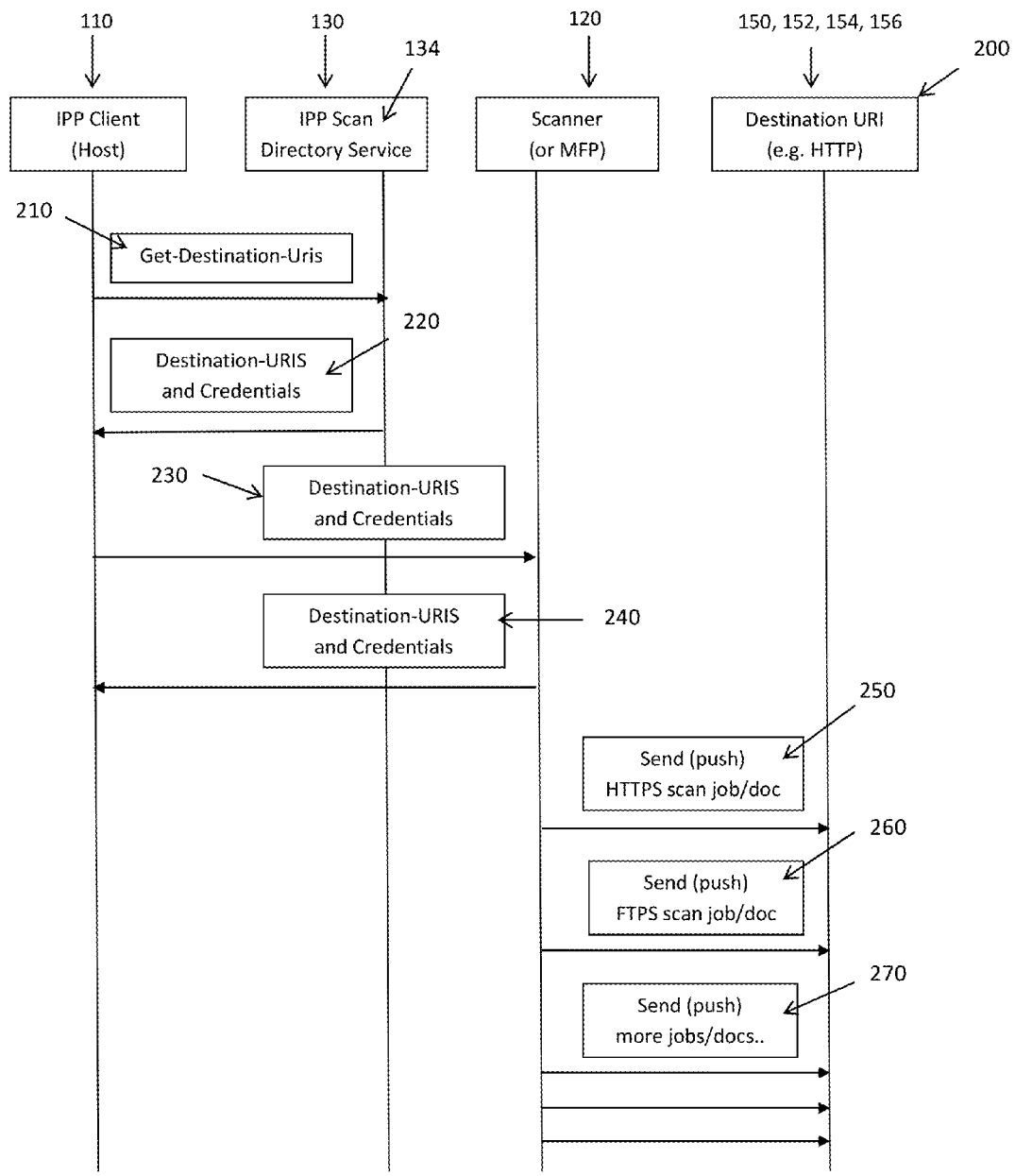
FIG. 2 is an illustration of a flow chart showing a transaction and message flow for a system having an IPP scan directory service (ISDS) in accordance with an exemplary embodiment.

FIG. 2 is an illustration of a flow chart 200 showing a transaction and message flow for a system having an IPP scan directory service (ISDS) 134 in accordance with an exemplary embodiment. In accordance with an exemplary embodiment, the system and method are specific to Push Scan as described in the IPP scan service specification, document PWG 5100.17. As shown in FIG. 2, the system 100 can include the IPP client 110 running on Mac® OS, Windows®, Linux® or a mobile device, the directory service server 130 running, for example, on a PC with Mac OS, Windows or Linux, and the destination URI host or server 150, 152, 154, 156, which can run any OS but must support the server side of the transfer protocol.

In accordance with an exemplary embodiment, in step 210, the IPP client 110 starts by sending an IPP Request using a vendor extension operation which is named Get-Destination-Uris. In addition, in step 210, the IPP client 110 may also send the Add-Destination-Uris and Delete-Destination-Uris (not shown) to the directory server 130 having the IPP scan directory service 134. In accordance with an exemplary embodiment, the IPP scan directory service (ISDS) server 130 contains a database 132 mapping the IPP client 110 to one or more destination-uris and corresponding destination-accesses (credentials) for each destination-uri. In step 220, the destination-uris and corresponding destination-accesses (credentials) for each destination-uri are sent to the IPP client 110 using a standard IPP response.

In step 230, the IPP client 110 sends an IPP (push scan) Create-Job that includes one or more of the destination-uris and destination-accesses as IPP attributes to the scanner or MFP 130. In this example, for example, at least two destination could be specified, for example, an HTTPS Server 150, 152, and an FTPS server 156. In step 240, the scanner or MFP responds to the IPP client 110 with an IPP response indicating success or failure in the receipt of the IPP (push scan) Create-Job. In steps 250, 260, the MFP 120 performs the scan and transmits the document to each destination-uri using the specified protocol and associated destination-accesses credentials. In addition, in step 270, the IPP (push scan) Create-Job can be sent to one or more additional servers 150, 152, 154, 156.

In accordance with an exemplary embodiment, for example, the IPP scan directory service (ISDS) 134 can be a directory service running on a host system or server 130, that manages the list of destinations to which an IPP client 110, 112 is allowed to send scanned documents. In accordance with an exemplary embodiment, the database 132 maintains this list in the form of destination-uris and the corresponding destination-accesses (credentials such as a user and password) for each IPP client 110, 112. In accordance with an exemplary embodiment, the destination-accesses define an access credential, for example, the username, password, or other type of user authentication, which is required by a receipt of the scanned document by a destination service.

In accordance with an exemplary embodiment, the destination-uris and destination accesses attributes are IPP attributes described in PWG 5100.15 and PWG 5100.17. As disclosed, the IPP client 110, 112 acquires the list of destination-uris and destination-accesses from the directory server (DS) 130. The server 130 runs as a service on a host operating system like Linux and maintains the database 132, which contains the list of destination-uris and destination-accesses usable by each IPP client to perform push scan jobs.

In accordance with an exemplary embodiment, the IPP client 110, 112 communicates with the directory server 130 using IPP (Internet Printing Protocol) or IPPS (Internet Printing Protocol Secure). However, in accordance with an exemplary embodiment, IPPS can be the preferred protocol for secure communication. In accordance with an exemplary embodiment, the IPP client 110 can issue one of three IPP requests using three IPP vendor extension operations. To retrieve the list of destination-uris and destination-accesses, the IPP client sends an IPP request with the operation code named Get-Destination-Uris 212. The directory server 130 replies with a standard IPP response containing the requested list of destination-uris and destination-accesses as IPP attributes in the same format as described in the PWG 5100.17 specification.

In accordance with an exemplary embodiment, the IPP client 110, 112 can also add new destination-uris and destination-accesses using a second IPP vendor extension operation, which can be named Add-Destination-Uris. The Add-Destination-Uris is the operation code to add one or more destinations to the database maintained by the directory server 130. The IPP client 110, 112 sends an Add-Destination-Uris IPP request to the directory service 134, which in turn responds with a standard IPP response indicating success or failure. The destination-uris and destination-accesses can be sent as IPP attributes in the same format as described in the PWG 5100.17 specification.

In accordance with an exemplary embodiment, the IPP client 110, 112 can also delete destination-uris and destination-accesses using a third IPP vendor extension operation, which can be named, for example, Delete-Destination-Uris. This operation code can be configured to delete one or more destinations in the database maintained by the directory server. The IPP client 110, 112 sends a Delete-Destination-Uris IPP request to the directory service 134, which in turn responds with a standard IPP response indicating success or failure. The destination-uris and destination-accesses are sent as IPP attributes in the same format as described in the PWG 5100.17 specification.

In accordance with an exemplary embodiment, the scanner or MFP 120 can also act as the directory server 130, therefore a separate host system or device can be eliminated or is not needed. In addition, the scanner or MFP 120 can also act as an IPP client capable of performing the vendor operations extensions described above to perform management of the directory service database 132.

In accordance with an exemplary embodiment, the directory server 130 runs in the form of an IPP server, however, the directory server can be configured to support only three IPP vendor extension operations for the purposes of this directory service 134. The IPP protocol relies on HTTP (or HTTPS), and therefore, the IPP protocol is used. In accordance with an exemplary embodiment, HTTP Digest authentication can be used by the directory server 130 to authenticate the IPP client, and HTTPS/IPPS can be recommended for secure communications. The destination-accesses attribute can be optional as per the IPP scan service specification. If destination-accesses attribute is not provided in a push scan job, it can be assumed that the receiving server (for example, HTTP) does not require credentials. In accordance with an exemplary embodiment, credentials can be optional, for example, in a local area network that is only reachable internally and by trusted users.

In accordance with an exemplary embodiment, the directory service (or ISDS) 134, which can be centralized on a host system (or server) 130 provides a solution for the requirements and issues disclosed above. In accordance with an exemplary embodiment, a plurality of (or multiple) IPP clients 110, 112 in a given enterprise or organization can have access to the directory service 134, and the directory service 134 can be secured so that only administrators with secure credentials can modify the data in the database (or table) 134 and the data for a given client 110, 112 is delivered using a secure protocol such as HTTPS+IPP or IPPS.

In accordance with an exemplary embodiment, a program with a graphical user interface hosted on the at least one client device 110, 112, the scanner or MFP 120, or the directory server 130 can be implemented to simplify entering the identity of each IPP client 110, 110 that has access to the directory server 130 and the list of destination-uris and destination-accesses that each client is allowed to use. In accordance with an exemplary embodiment, the mapping can be one-to-one or one-to-many, or for example, one-to-a plurality. Most commonly, it may be one-to-many (or one-to-a plurality) as a single IPP client 110, 112 will likely want to perform push scans to more than a single destination.

Directory Service Characteristics

Since the IPP scan specification does not specify how the IPP client knows what destination-uris are accessible by each IPP client 110, 112 and the destination-accesses (credentials) to transmit to each destination, this information can be given to the user (IPP client 110, 112) by some form of communication, verbal, written or electronic (for example, e-mail). However, this can present some risks associated with these communication types, for example, security exposure, security considerations, and potential lack of accuracy, like spelling errors.

In accordance with an exemplary embodiment, the IPP scan directory service (ISDS) application 134 can be a secure and a dynamic acquisition by an IPP client 110, 112 of the destination-uris available to it as well as the credentials needed to perform the scanned document(s) transmission when processing a push scan job. In addition, the method and system as disclosed can leverage on the same protocols used by an IPP client 110, 112 and IPP server 130 to communicate via requests and responses. For example, these protocols can include TCP/IP, HTTP/HTTPS and IPP/IPPS. These protocols can be used to communicate between the IPP client 110, 112 and the directory server 130.

In accordance with an exemplary embodiment, the secure form (SSL/TLS) encrypted form of these protocols is recommended. For example, when transmitting to a remote host over an insecure medium (for example, the Internet 170). In accordance with an exemplary embodiment, the directory service 134 is applicable only to push scan. For example, pull scan does not require a directory service. The directory service 134 can be configured to run on a separate host system, for example, a server 130, which can act as a central point serving a plurality of IPP clients 110, 112. The server 130 of the directory service 134, which serves client queries is referred to as the ISDS Server and runs on a host operating system like Linux®.

In accordance with an exemplary embodiment, the directory server 130 acts as an IPP service but only needs to support the three vendor extension operations defined in this disclosure: 1) Get-Destination-Uris, 2) Add-Destination-Uri and 3) Delete-Destination-Uri. In accordance with an exemplary embodiment, the directory server 130 maintains the list of IPP clients 110, 112 and corresponding destination-uris and destination-accesses in the form of the database 132. A database management system (DBMS) like MySQL can be used to manage the database 132 and perform operations like adding and removing IPP clients 110, 112, as well as adding and deleting destination-uris and destination-accesses. Performing lookup and retrieval of this information can also via the database management system (DBMS). The database maintained by the Directory Server can be named the ISDS database.

The Directory Service Administrator Application

In accordance with an exemplary embodiment, the directory server 130 and its associated directory service database 132 can be managed through a software component or application. In accordance with an exemplary embodiment, the software component or application can be integrated with the server 130 or the application can be a separate program that serves as the "front end" to the directory server 130. The software component or application can be named the "IPP Scan directory service (ISDS) administrator application" or "IPP Scan directory administrator application" and can run on the same host system as the directory server, for example, directory server 130.

In accordance with an exemplary embodiment, only authorized system administrators can have access to the sever 130 on which the directory service (ISDS) administrator runs and therefore only the administrators have access to the directory service (ISDS) administrator application. In accordance with an exemplary embodiment, the directory service (ISDS) administrator application can be implemented using a graphical user interface (GUI) for ease of use.

In accordance with an exemplary embodiment, through the directory service (ISDS) administrator application, a system administrator can perform the following operations:

(1) Add IPP clients and authentication information to the directory service database;
(2) Delete IPP clients and all associated information from the directory service database;
(3) Modify IPP clients and all associated information from the directory service database;
(4) Add destination-uris and destination-accesses for each IPP client contained in the directory service database;
(5) Delete destination-uris and destination-accesses for each IPP client contained in the directory service database; and
(6) Query and display IPP clients and associated information, including authentication information and destination-uris and destination-accesses.

In accordance with an exemplary embodiment, the general operation of the IPP scan directory service (ISDS) 134 can include the interaction between the systems running an IPP client 110, 112 and a central host system running the IPP scan directory service in the form of an application or server, for example, the directory server 130. In accordance with an exemplary embodiment, the communication between the IPP clients 110, 112 and the directory server 130 is over the network 160, 170 using the IPP client-server model and uses a set of three IPP vendor extension operations. Each operation is sent as a standard IPP request by an IPP client 110, 112. The operation is received and processed by the directory server 130. At the completion of processing the directory service 134 replies with a standard IPP response indicating success or failure and in the case of the primary operation (Get-Destination-Uris) the list of destination-uris and corresponding destination-accesses is contained in the response in the same form (IPP collection attribute) defined in the IPP Scan Specification (PWG 5100.17).

In accordance with an exemplary embodiment, the three vendor extension operations are an integral component of the disclosure. In addition, an application that serves as the front end to manage the use of these IPP vendor extension operations, or an IPP client management application is described, followed by the flow of operation for each of the vendor extensions operations in the following sections The IPP Client Management App In accordance with an exemplary embodiment, the end-user running the IPP client 110, 112 can use a program or application in which the user can select the destinations received from the directory server 130 where the scanned document should be transmitted. For example, in accordance with an exemplary embodiment, the application can be implemented using a graphical user interface (GUI) on the IPP client 110, 112. The application preferably runs on the same host system as the IPP client 110, 112. The IPP client management application also serves as the "front end" which manages the interaction between the IPP client 110, 112 and the directory server 130.

In accordance with an exemplary embodiment, through the IPP client management application, an end-user can perform the following operations:

(1) Add the IP address of the directory service 134 with which communication will take place and to which directory service vendor extension operations IPP requests will be sent;
(2) Retrieve the list of destination-uris from the directory server 130 and display the list to the end-user.
(3) Allow the end-user to select which destinations the scanned document should be sent, which can be presented and performed, for example, using selection "check boxes" on a graphical user interface (GUI) on the IPP client 110.
(4) Add additional destinations to the directory server database 132. In accordance with an exemplary embodiment, however, these destinations can only be added for the IPP client 110, 112 running on the requesting host system and identified by its discovery service credentials.
(5) Delete destinations from the directory server database 132. In accordance with an exemplary embodiment, however, these destinations can only be deleted for the one IPP client 110, 112 running on the requesting host system and identified by its discover service credentials.
(6) Initiate the create-Job (scan type) that will be sent to the scanner or MFP 120 to request that the scanned document be sent to the specified destination(s) using the protocol identified by each destination-uri.

In accordance with an exemplary embodiment, a client (or user) who is properly *authorized* as an administrator can perform management of an entirety of the directory server database 132. For example, changes that apply to other "IPP clients 110, 112" can be made by the authorized client or user, such that the directory server database 132 can be managed remotely without a monitor+keyboard+mouse (a "headless" host system).

In accordance with an exemplary embodiment, a single client device 110, 112 of the least one client device 110, 112, can be configured to perform the add/delete/query/display destination-uris and destination-accesses for each of the one IPP clients 110, 112.

Get-Destination-Uris

In accordance with an exemplary embodiment, the IPP client 110, 112 sends a Get-Destination-Uris request to retrieve the list of destination-uris and destination-accesses (access credentials) it is allowed to send (push) scanned documents. Get-Destination-Uris is a vendor extension operation. Upon receiving the Get-Destination-Uris request, the directory server 130 performs a database 132 lookup based on the identity of the IPP client 110, 112, which can be supplied via either HTTP Basic or Digest Authentication. If the database 132 lookup is successful, the directory server 130 returns the destination-uris and destination-accesses in the IPP response with an IPP status code indicating success. The destinations and credentials are returned in the form of IPP attributes. In accordance with an exemplary embodiment, the IPP attributes are of the same type as those described in the IPP Scan Service specification.

In accordance with an exemplary embodiment, once the list of destination-uris and destination-accesses has been retrieved, the IPP client 110, 112 sends an IPP Scan Create-Job request to a scanner or an MFP 120 with a scan unit. The scanner or MFP 120 performs the transmission of the scanned document to one or more destinations following the procedures defined in the IPP Scan Specification (PWG 5100.17).

Add-Destination-Uris

In accordance with an exemplary embodiment, the IPP client 110, 112 sends a Add-Destination-Uris request to the directory server 130 to add one or more destination-uris and corresponding destination-accesses (access credentials) to the directory service database 132. Add-Destination-Uris is a vendor extension operation. Upon receiving the Add-Destination-Uris request, the directory server 130 first verifies that the IPP client 110, 112 exists in the database. In addition, the directory server 130 also authenticates the IPP client 110, 112. Upon verification, the directory server 130 processes each of the destination-uris. If the destination is already present in the database 132, the destination can be ignored. If the destination it is not present in the database 132, the destination and associated credentials are added to the list of destination-uris and destination-accesses corresponding to the specified IPP client 110, 112. The directory server 130 replies to the Add-Destination-Uris with a standard IPP response indicating success or failure. In addition to the status code only the standard response operation attributes are returned. The response operation attributes can be: attributes-charset, attributes-natural-language and status-message. The Add-Destination-Uris request and response involve communication only between the IPP client 110, 112 and the directory server 130. The Add-Destination-Uris request and response does not involve communication with the scanner or MFP 120, nor communicate with any destination 150, 152, 154, 156.

Delete-Destination-Uris

In accordance with an exemplary embodiment, the IPP client 110, 112 sends a Delete-Destination-Uris request to the directory server 130 to delete or remove one or more destination-uris and corresponding destination-accesses (access credentials) contained in the directory service database 132. Delete-Destination-Uris is a vendor extension operation. Upon receiving the Delete-Destination-Uris request, the directory server 130 first verifies that the IPP client 110, 112 exists in the database 132. In addition, the directory server 130 also authenticates the IPP client 110, 112. Upon verification, the directory server 130 processes each of the destination-uris. If the destination is not present in the database 132, the Delete-Destination-Uris request can be ignored. If the destination is present in the database 132, the destination and associated credentials are removed from the list of destination-uris and destination-accesses corresponding to the specified IPP client 110, 112. The directory server 130 replies to the Delete-Destination-Uris with a standard IPP response indicating success or failure. In addition to the status code only the standard response operation attributes are returned. The response operation attributes can be attributes-charset, attributes-natural-language, and status-message. The Delete-Destination-Uris request and response involve communications only between the IPP client 110, 112 and the directory server 130. The Delete-Destination-Uris request and response do not involve communication with the scanner or MFP 120 nor communication with any destination 150, 152, 154, 156.

In accordance with an exemplary embodiment, for example, the directory service 134 could be used to supply IPP clients 110, 112 with other IPP attributes or IPP related information which may be difficult to maintain or centralize in an MFP 120. Specially, for example, MFPs 120 with limited resources, for example, limited or no storage medium. In addition, the directory service 134 could be used by IPP clients 110, 112 to obtain a list of other resources like which printers and their associated URIS are allowed to access.

In accordance with an exemplary embodiment as disclosed herein, the directory service 134 need not run on a separate host system. For example, an MFP 120 with sufficient resources, such as a user interface and memory, could also act as a directory server 120. In addition, the directory service could be applied to other IPP services, for example, the IPP FaxOut Service. MFPs 120 could also interact with the directory service (as IPP clients) to obtain information, for example, IPP printer description attributes, which would allow the maintenance and administration of this information to be centralized.

Figure 3:
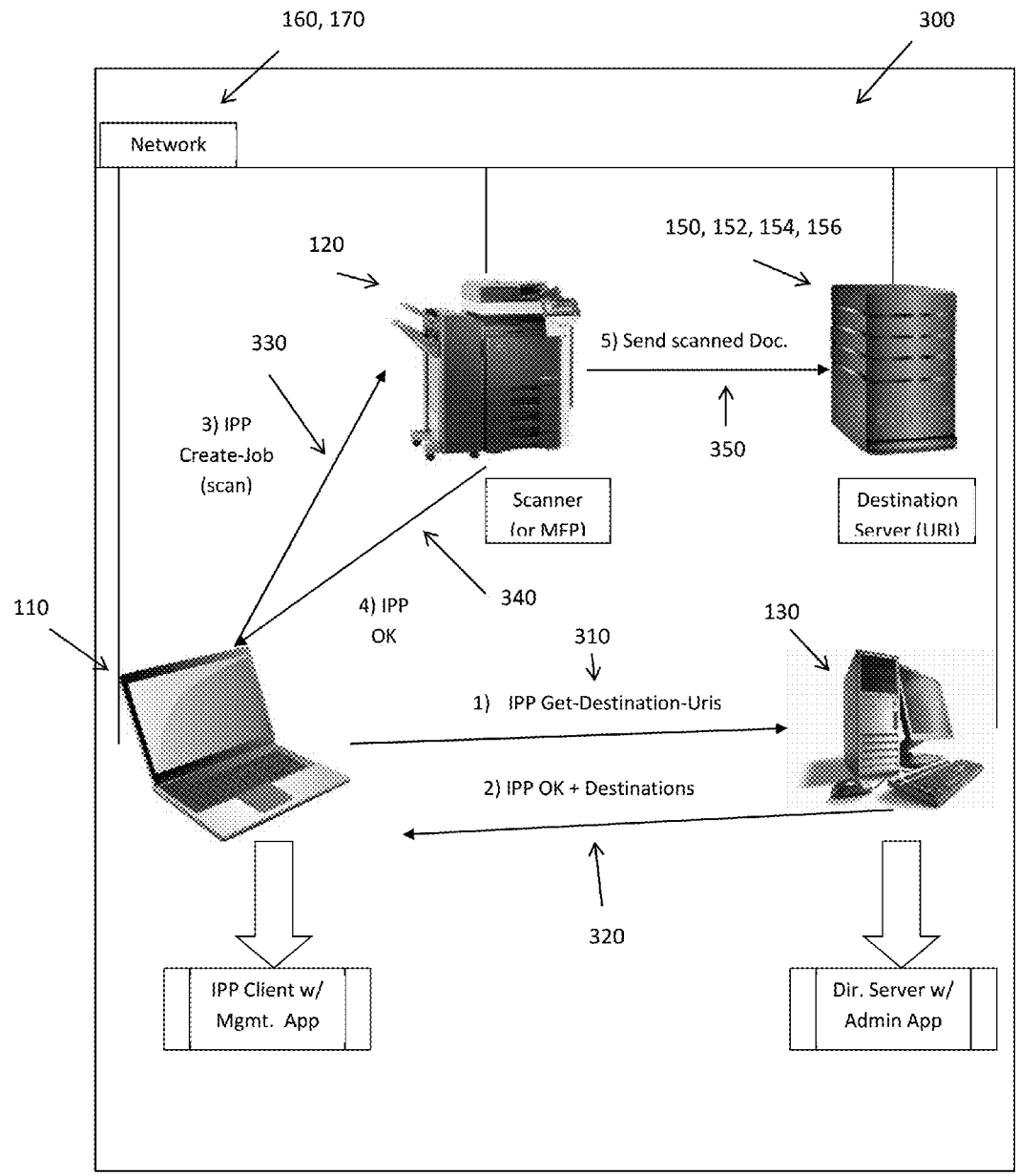
FIG. 3 is an illustration of a system having an IPP scan directory service (ISDS) connectivity in accordance with an exemplary embodiment showing the host systems and sequence of transactions.

FIG. 3 is an illustration of a system 300 having an IPP scan directory service (ISDS) connectivity in accordance with an exemplary embodiment showing the host systems and sequence of transactions between the various host systems and illustrates how the directory service is used. In accordance with an exemplary embodiment, the system 300 illustrated can include an IPP client 110 running on a laptop. For example, the IPP client 110 can be laptop, desktop, mobile device and the IPP Client is an application running under a host OS like Windows, Mac OS, Linux, Android®, IOS, etc. The directory server 130 in this exemplary embodiment is illustrated as a tower server with monitor and keyboard attached, and running under a host operating system like Linux, Windows, Mac OS, etc. The scanner or MFP 120 illustrated can be, for example, a mid-sized and contains a scanning unit and implements the IPP Scan Service. The destination servers 150, 152, 154, 156 may be "headless" or may have a monitor and keyboard attached and must support receiving scanned documents using the protocol specified via the destination-uri.

In accordance with an exemplary embodiment, the sequence of transactions illustrated in FIG. 3 can include in step 310, the IPP client 110 sends an IPP request to the directory server 130 using the vendor extension operation Get-Destination-Uris. In accordance with an exemplary embodiment, for example, HTTPS digest authentication may be used. The directory server 130 looks up the IPP client 110 in the database, retrieves the corresponding destination-uris and destination-accesses and returns them in a standard IPP response with status code OK. If there is, any failure, the status code "bad-request" can be returned. The IPP client 110 in step 330 sends an IPP (push scan) Create-Job request to the scanner or MFP 120. The IPP (push scan) Create-Job request having one or more of the destination-uris and destination-accesses provided by the directory server 130. In step 340, the scanner or MFP 120 sends a standard IPP response to the IPP client 110, which IPP response, which can be "OK". If an error is detected in the IPP Request, an error status code is returned. The scanner or MFP 120 proceeds to scan the document on the platen and transmits the scanned document in step 350 to one or more of the destination servers 150, 152, 154, 156 specified by destination-uris using the protocol specified in each URI and the corresponding credentials specified in the destination-accesses attribute.

In accordance with an exemplary embodiment, a non-transitory computer readable medium containing a computer program having computer readable code embodied to carry out a method of providing Uniform Resource Identifiers for Push Scan jobs pursuant to an Internet Printing Protocol (IPP) is disclosed, the method comprising: hosting a database of IPP clients and destination Uniform Resource Identifiers (destination-uris) for each of the IPP clients, the database of destination-uris defining each of the destination-uris in which each of the IPP clients are authorized to send Push Scan jobs; receiving a request from an IPP client for at least one Uniform Resource Identifier (URI) for a Push Scan job; checking the database to determine if the IPP client is authorized to send the Push Scan job to the at least one URI; and sending the destination-uris to the IPP client upon determination that the IPP client is authorized to send the Push Scan job to the at least one URI.

The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A non-transitory computer readable medium containing a computer program having computer readable code embodied to carry out a method of providing Uniform Resource Identifiers for Push Scan jobs pursuant to an Internet Printing Protocol (IPP), the method comprising:
   hosting a database of IPP clients and destination Uniform Resource Identifiers (destination-uris) for each of the IPP clients, the database of destination-uris defining each of the destination-uris in which each of the IPP clients are authorized to send Push Scan jobs;
   receiving a request from an IPP client for at least one Uniform Resource Identifier (URI) for a Push Scan job;
   checking the database to determine if the IPP client is authorized to send the Push Scan job to the at least one URI; and
   sending the destination-uris to the IPP client upon determination that the IPP client is authorized to send the Push Scan job to the at least one URI.

2. The computer readable medium of claim 1, comprising:
   hosting access credentials (destination-accesses) on the database of IPP clients and destination-uris for each of the destination-uris, the destination-accesses defining an access credential for a receipt of the Push Scan job to process the Push Scan job; and
   adding the destination-accesses to each of the destination-uris sent to the IPP client.

3. The computer readable medium of claim 2, comprising:
   sending the destination-uris and destination-accesses to the IPP client as IPP attributes described in IPP Scan Service specification, document PWG 5100.17.

4. The computer readable medium of claim 1, comprising:
   receiving a request from the IPP client to add one or more destination-uris to the database of IPP clients and destination-uris;
   verifying the IPP client in the database; and
   adding the one or more destination-uris to the database for the IPP client upon verification of the IPP client.

5. The computer readable medium of claim 4, comprising:
   adding the one or more destination-uris to the database of IPP clients and destination-uris only if the one or more destination-uris is not presently in the database of destination-uris.

6. The computer readable medium of claim 1, comprising:
   receiving a request from the IPP client to delete one or more destination-uris from the database of IPP clients and destination-uris;
   verifying the IPP client in the database of destination-uris; and
   deleting the one or more destination-uris from the database of destination-uris for the IPP client upon verification of the IPP client.

7. The computer readable medium of claim 1, comprising:
   managing the database of IPP clients and destination-uris with an administrator application, the administrator application configured to:
   display destination-uris from the database of destination-uris;
   add the destination-uris to the database of destination-uris; and
   delete destination-uris from the database of destination-uris.

8. The computer readable medium of claim 7, wherein the administrator application is configured to:
   add IPP clients and authentication information to the database of IPP clients and destination-uris;
   delete IPP clients and authentication information to the database of destination-uris; and
   modify IPP clients and authentication information to the database of destination-uris.

9. A method of providing Uniform Resource Identifiers for Push Scan jobs pursuant to an Internet Printing Protocol (IPP), the method comprising:
   hosting a database of destination Uniform Resource Identifiers (destination-uris) and access credentials (destination-accesses) for one or more IPP clients on a server, the database of destination-uris and destination-accesses defining each of the destination-uris in which the one or more IPP clients are authorized to send a Push Scan job and the access credentials for a receipt of the Push Scan job to process the Push Scan job;
   receiving a request from an IPP client of the one or more IPP clients for at least one Uniform Resource Identifier (URI) for the Push Scan job;
   checking the database of destination-uris and destination-accesses to determine if the IPP client is authorized to send the Push Scan job to the at least one URI; and
   sending the destination-uris and destination-accesses to the IPP client upon determination that the IPP client is authorized to send the Push Scan job to the at least one URI.

10. The method of claim 9, comprising:
   sending the destination-uris and destination-accesses to the IPP client as IPP attributes described in the IPP Scan Specification (PWG 5100.17).

11. The method of claim 9, comprising:
   receiving a request from the IPP client to add one or more destination-uris and destination-accesses to the database of destination-uris and destination-accesses;
   verifying the IPP client in the database of destination-uris and destination-accesses; and
   adding the one or more destination-uris and destination-accesses to the database of destination-uris and destination-accesses for the IPP client upon verification of the IPP client.

12. The method of claim 11, comprising:
   adding only the destination-uris and destination-accesses to the database of destination-uris and destination-accesses if the destination-uris and destination-accesses are not present in the database of destination-uris and destination-accesses.

13. The method of claim 9, comprising:
   receiving a request from the IPP client to delete one or more destination-uris and destination-accesses from the database of destination-uris and destination-accesses;
   verifying the IPP client in the database of destination-uris and destination-accesses; and
   deleting the one or more destination-uris and destination-accesses from the database of destination-uris and destination-accesses for the IPP client upon verification of the IPP client.

14. The method of claim 9, comprising:
   sending the destination-uris and destination-accesses received from the database of destination-uris and destination-accesses to a scanner with a request to create a Push Scan job, the scanner configured to scan a document and send the scanned document to the destination-uris with the destination-accesses.

15. The method of claim 14, comprising:
   hosting the IPP client, the database of destination-uris and destination-accesses, and the scanner in a Multi-function Peripheral/Device (MFP/MFD) with IPP Scan server functionality.

16. A system for providing Uniform Resource Identifiers for Push Scan jobs pursuant to an Internet Printing Protocol (IPP), the system comprising:
   a database of destination Uniform Resource Identifiers (destination-uris) and access credentials (destination-accesses) for one or more IPP clients, the database of destination-uris and destination-accesses defining each of the destination-uris in which the one or more IPP clients are authorized to send a Push Scan job and the access credentials for a receipt of the Push Scan job to process the Push Scan job;
   an IPP client configured to send a request to the database of destination-uris and destination-accesses for at least one Uniform Resource Identifier (URI) for the Push Scan job; and
   a computer program having an IPP Scan directory administrator application configured to:
      receive the request from the IPP client for the at least one Uniform Resource Identifier (URI) for the Push Scan job;
      check the database of destination-uris and destination-accesses to determine if the IPP client is authorized to send the Push Scan job to the at least one URI; and
      send the destination-uris and destination-accesses to the IPP client as IPP attributes described in the IPP Scan Specification (PWG 5100.17) to the IPP client upon determination that the IPP client is authorized to send the Push Scan job to the at least one URI.

17. The system of claim 16, comprising:
   a scanner or a Multi-function Peripheral (MFP) with a scan unit, the scanner or the MFP with the scan unit configured to receive the destination-uris and destination-accesses with a request to create a Push Scan job from the IPP client, and wherein the scanner scans a document and sends the scanned document to the destination-uris with the destination-accesses.

18. The system of claim 16, comprising:
   a server configured to host the database of destination-uris and destination-accesses and the computer program having the IPP Scan directory administrator application.

19. The system of claim 16, comprising:
   a Multi-function Peripheral/Device (MFP/MFD) with IPP Scan server functionality, the MFP/MFD hosting the IPP client, the database of destination-uris and destination-accesses, the computer program having the IPP Scan directory administrator application, and the scanner.

20. The system of claim 16, comprising:
   a directory service administrator application, the directory service administrator application configured to manage the database of destination-uris and destination-accesses for the IPP client; and
   an IPP client management application hosted on the IPP client, the IPP client management application configured select the destinations received from the directory server and manage interactions between the IPP client and the computer program having the IPP scan directory administrator application.

* * * * *